United States Patent
Cha

(10) Patent No.: US 9,112,358 B2
(45) Date of Patent: Aug. 18, 2015

(54) POWER SUPPLY DEVICE AND POWER SUPPLYING METHOD FOR POWER SUPPLY DEVICE

(75) Inventor: Jae-deok Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 13/223,709

(22) Filed: Sep. 1, 2011

(65) Prior Publication Data

US 2012/0025767 A1 Feb. 2, 2012

Related U.S. Application Data

(62) Division of application No. 11/672,234, filed on Feb. 7, 2007, now abandoned.

(30) Foreign Application Priority Data

Mar. 8, 2006 (KR) .................. 10-2006-0021727
Jul. 6, 2006 (KR) .................. 10-2006-0063352

(51) Int. Cl.
*H02J 7/00* (2006.01)
*G06F 1/26* (2006.01)

(52) U.S. Cl.
CPC ............ *H02J 7/0013* (2013.01); *G06F 1/26* (2013.01); *G06F 1/263* (2013.01); *H02J 7/0068* (2013.01)

(58) Field of Classification Search
CPC ....... H02J 7/008; H02J 7/0031; H02J 7/0054; H02J 7/0055; H02J 7/0068
USPC ......... 320/103, 111, 112, 114, 120, 136, 138, 320/163
See application file for complete search history.

(56) References Cited

U.S. PATENT DOCUMENTS 5,563,493 A * 10/1996 Matsuda et al. ............... 320/124
5,721,481 A * 2/1998 Narita et al. .................. 320/111

(Continued)

FOREIGN PATENT DOCUMENTS

| JP | 8-251830 A | 9/1996 |
| JP | 2001-258260 A | 9/2001 |

(Continued)

OTHER PUBLICATIONS

American Power Conversion Corp., "Mobile Power Pack (UPB10)" User's Manual, 2006.

(Continued)

*Primary Examiner* — Edward Tso
*Assistant Examiner* — Aaron Piggush
(74) *Attorney, Agent, or Firm* — Jefferson IP Law, LLP

(57) ABSTRACT

A power supply device includes a battery, a charging part charging the battery, a power input to receive adapter power from an adapter supplied with external power or power output from a similarly configured power supply device, a power output part to output the adapter power, the power output of a similarly configured power supply device, or the battery power of the battery, and a controller to control the input power to apply power to the charging part and the power output part when the input power is supplied to the power input part, and to control the battery to apply power to the power output part when the input power is not supplied to the power input part. Thus, the power supply device is capable of applying power from an adapter to a portable electronic device while charging an internal battery with the adapter power.

24 Claims, 6 Drawing Sheets

(56) References Cited

U.S. PATENT DOCUMENTS 6,888,337 B2    5/2005    Sawyers
7,002,265 B2 *    2/2006    Potega ......................... 307/149

FOREIGN PATENT DOCUMENTS

| | | |
|---|---|---|
| JP | 2005-278303 A | 10/2005 |
| KR | 10-1993-0020822 A | 10/1993 |
| KR | 10-1997-0006393 B1 | 4/1997 |
| KR | 1999-0037412 U | 10/1999 |
| KR | 10-2004-0010460 A | 1/2004 |
| KR | 20-0275514 Y1 | 5/2005 |
| KR | 10-2005-0120874 A | 12/2005 |

OTHER PUBLICATIONS

American Power Conversion Corp., "Back-UPS ES 650" User's Guide, 2004.

* cited by examiner

POWER SUPPLY DEVICE AND POWER SUPPLYING METHOD FOR POWER SUPPLY DEVICE

CROSS-REFERENCE TO RELATED APPLICATIONS

This application is a divisional application of prior application Ser. No. 11/672,234, filed on Feb. 7, 2007, which claims the benefit under 35 U.S.C§119 (a) of Korean Application No. 2006-21727, filed Mar. 8, 2006 in the Korean Intellectual Property Office, and Korean Application No. 2006-63352, filed on Jul. 6, 2006, in the Korean Intellectual Property Office, the entire disclosure of each of which is hereby incorporated reference.

BACKGROUND OF THE INVENTION

1. Field of the Invention

Aspects of the present invention relate to a power supply device, and more particularly, to a power supply device for supplying power to an electronic device, and a power supplying method for the power supply device.

2. Description of the Related Art

In general, a portable electronic device obtains its operating power from an adapter connected to an external power source, from a built-in battery, or from an external power supply device (such as an external battery).

A conventional external power supply device operates in either a charging mode or a discharging mode for bidirectional control. Specifically, the conventional external power supply device operates in the charging mode to charge an internal battery of the power supply when connected to an adapter. The conventional external power supply operates in the discharge mode to apply power from the charged internal battery to a portable electronic device when the conventional external power supply device is connected to the portable electronic device and is not connected to an adapter.

In such a conventional external power supply device, power for the charging or discharging mode is supplied through one terminal. A toggle switch is provided, and the charging or discharging mode is selected according to the setting of the toggle switch. In this case, however, it is inconvenient for a user, as the user has to switch the toggle switch every time to change the charging/discharging mode; moreover, there may arise a problem that an incorrect switch setting will cause the internal battery to be discharged even though the adapter is connected to an external power source.

As described above, since the conventional external power supply device can operate only in either the charging mode or the discharging mode, power cannot be applied to the portable electronic device while the power supply charges the built-in battery. For this reason, it is impossible to connect a plurality of external power supply devices to the portable electronic device, as any external power supply device in the series that was charging would not supply power to the next power supply device in the series or to the portable electronic device.

SUMMARY OF THE INVENTION

An aspect of the present invention provides a power supply device, which is capable of applying power through an adapter to a portable electronic device or to a similarly configured power supply device, while charging an internal battery with the adapter power, and a power supplying method for the power supply device.

Another aspect of the present invention provides a power supply device, which can be universally used for common portable electronic devices, and a power supplying method for the power supply device.

Additional aspects and/or advantages of the invention will be set forth in part in the description which follows and, in part, will be obvious from the description, or may be learned by practice of the invention.

An aspect of the present invention includes a power supply device comprising a battery; a charging part to charge the battery; a power input part receiving adapter power from an adapter connected thereto; a power output part to output one of: the adapter power and the battery power of the battery; and a controller to control the adapter power to apply power to the charging part and the power output part when the adapter is connected to the power input part, and to control the battery to apply power to the power output part when the adapter is not connected to the power input part.

According an aspect of the present invention, the power output part comprises a power output terminal having the same configuration as an the adapter connecting terminal of the adapter that connects to the power input part; and the power input part comprises a power input terminal the same configuration as an electronic device connecting terminal of an electronic device that receives either the adapter power or the power output through the power output part.

According an aspect of the present invention, the controller comprises a first switching part to control the adapter power to be applied to the charging part and the power output part, and a second switching part to control the battery power to be applied to the power output part.

According an aspect of the present invention, the first switching part comprises a first transistor interposed between the power input part and the power output part and turned on to apply the input power to the charging part and the power output part, and a first diode connected in parallel to the first transistor and having an anode connected to one end of the first transistor and a cathode connected to the other end of the first transistor; the second switching part comprises a second transistor interposed between the battery and the power output part and turned on to apply the battery power to the power output part, and a second diode connected in parallel to the second transistor and having an anode connected to one end of the second transistor and a cathode connected to the other end of the second transistor.

According to an aspect of the present invention, when the adapter power is supplied through the power input part, the first switching part is switched on and the second switching part is switched off, so as to apply the adapter power to the charging part and to the power output part; and when the adapter power is not supplied through the power input part, the first switching part is switched off and the second switching part is switched on, so as to apply the battery power to the power output part.

According to an aspect of the present invention, the controller further comprises a microcontroller that compares the voltage difference between the adapter power and the battery power with a predetermined reference value, and turns on one of the first transistor and the second transistor according to a result of the comparison.

According to another aspect of the present invention, the controller further comprises a microcontroller that controls the first switching part to be switched on and the second switching part to be switched off, so as to apply the adapter power to the charging part and the power output part when the adapter power is supplied through the power input part; and controls the first switching part to be switched off and the second switching part to be switched on, so as to apply the battery power to the power output part when the adapter power is not supplied through the power input part.

According to an aspect of the present invention, the power supply device further comprises a voltage regulator to regulate one of the adapter power and the battery power, which is output through the power output part, so as to have a predetermined output voltage level.

According to an aspect of the present invention, the voltage regulator further comprises a buck/boost circuit placed ahead of the power output part to regulate one of the adapter power and the battery power applied to the power output part, so as to have the predetermined output voltage level, and to output the regulated power to the power output part.

Another aspect of the present invention provides a power supplying method for a power supply device having a battery and a charging part charging the battery, the power supplying method comprising connecting the input of the power supply device to an external power source, either an adapter or a similarly configured power supply device; determining whether the input power is supplied to the power supply device; outputting the input power to an external electronic device or similarly configured power supply device, when the input power is supplied to the power supply device; and outputting the battery power of the battery to the external electronic device or to a similarly configured power supply device, when the input power is not supplied to the power supply device.

According an aspect of the present invention, the power supplying method further comprises charging the battery of the power supply device by the charging part that receives the input power.

According to an aspect of the present invention, the power supplying method further comprises regulating one of the input power and the battery power to have a predetermined output voltage level.

According to an aspect of the present invention, the power supplying method further comprises powering the portable electronic device by connecting the adapter to the portable electronic device, and charging the internal battery of the portable electronic device using the adapter power.

According to an aspect of the present invention, the power supplying method further comprises powering the power supply device by connecting the power output of a second similarly configured power supply device to the power input of the first power supply device; and charging the internal battery of the first power supply device using the power output of the second power supply device Another aspect of the present invention provides a power supplying system comprising an adapter supplying adapter power from an external power source; a power supply device comprising a battery; a charging part charging the battery; a power input part receiving input power, which is one of: power from an adapter, or power output from a similarly configured power supply device; a power output part outputting one of: the input power or the battery power of the battery, to one of: an electronic device or a similarly configured power supply device; a controller controlling the input power to be applied to the charging part and to the power output part when the power input part is supplied with the input power, and controlling the battery power to be applied to the power output part when the power input part is not supplied the input power; and an electronic device having an electronic device connecting terminal connected to the power output part, the electronic device utilizing one of the input power or the battery power supplied through the electronic device connecting terminal.

According to an aspect of the present invention, the controller comprises a first switching part controlling the input power to be applied to the charging part and the power output part, and a second switching part controlling the battery power to be applied to the power output part.

According to an aspect of the present invention, when the input power is supplied to the power input part, the first switching part is switched on and the second switching part is switched off, so as to apply the input power to the charging part and the power output part; and when the input power is not supplied to the power input part, the first switching part is switched off and the second switching part is switched on, so as to apply the battery power to the power output part.

According to an aspect of the present invention, the first switching part comprises a first transistor interposed between the power input part and the power output part and turned on to apply the input power to the charging part and the power output part; a first diode connected in parallel to the first transistor, the first diode having an anode connected to one end of the first transistor and a cathode connected to the other end of the first transistor; and the second switching part comprises: a second transistor interposed between the battery and the power output part and turned on to apply the battery power to the power output part; and a second diode connected in parallel to the second transistor, the second diode having an anode connected to one end of the second transistor and a cathode connected to the other end of the second transistor.

According to an aspect of the present invention, the controller comprises a microcontroller that compares a voltage difference between the input power and the battery power with a predetermined reference value and turns on one of the first transistor and the second transistor according to a result of the comparison.

According to another aspect of the present invention, the controller comprises a microcontroller that controls the first switching part to be switched on and the second switching part to be switched off, so as to apply the input power to the charging part and the power output part when the input power is supplied to the power input part; and controls the first switching part to be switched off and the second switching part to be switched on, so as to apply the battery power to the power output part when the input power is not supplied to the power input part.

According to an aspect of the present invention, the power supplying system further comprises a voltage regulator that regulates one of the input power and the battery power output through the power output part, so as to have a predetermined output voltage level.

According to an aspect of the present invention, the voltage regulator comprises a buck/boost circuit placed ahead of the power output part to regulate one of the input power and the battery power applied to the power output part, so as to have the predetermined output voltage level, and to output the regulated power to the power output part.

According to an aspect of the present invention, the power output terminal has the same configuration as the adapter connecting terminal of the adapter that connects to the power input part; and the power input terminal has the same configuration as an electronic device connecting terminal of an electronic device that connects to the power output part.

According to an aspect of the present invention, when the input power is supplied to the power input part of the power supply device, the power supplying system operates in a power supply device charging mode where the charging part charges the battery with the input power input to the power supply device.

According to another aspect of the present invention, when the input power is not supplied to the power input part of the power supply device, the power supplying system operates in a power supply device discharging mode where the battery power of the battery is applied to the power output part through the second switching part and the voltage regulator.

According to another aspect of the present invention, when the adapter connecting terminal of the adapter is connected to the electronic device connecting terminal of the electronic device, so as to apply the adapter power to the electronic device, the electronic device operates with the supplied adapter power and an internal battery of the electronic device is charged with the adapter power.

According to another aspect of the present invention, when the input power is supplied to the power input part of the power supply device and the electronic device is connected to the power output part of the power supply device: the charging part charges the battery with the input power input to the power supply device; the input power, regulated by the voltage regulator, is applied to the power output part; the electronic device operates with the input power supplied from the power supply device; and an internal battery of the electronic device is charged with the input power.

According to another aspect of the present invention, the power supplying system further comprises another power supply device connected to the output part of the power supply device and to the electronic device connecting terminal of the electronic device, the another power supply device comprising another battery; another charging part charging the battery; another power input part receiving adapter power connected to the adapter; another power output part outputting the adapter power to the power supply device; a controller controlling the adapter power to be applied to the charging part and to the power output part when the power input part is supplied with the adapter power, and controlling the battery power to be applied to the power output part when the power input part is not supplied with adapter power.

Another aspect of the present invention includes a power supply device comprising a battery; a charging part to charge the battery; a power input part to receive one of: adapter power from an adapter supplied with external power, or power output from a similarly configured power supply device, the power input part being shaped to connect to the adapter and a power output part of a similarly configured power supply device; a power output part to output one of: the adapter power, the power output of a similarly configured power supply device, or the battery power of the battery; and a controller to control the input power to apply power to the charging part and the power output part when the input power is supplied to the power input part, and to control the battery to apply power to the power output part when the input power is not supplied to the power input part.

According an aspect of the present invention, the power output part comprises a power output terminal having the same configuration as an the adapter connecting terminal of the adapter that connects to the power input part; and the power input part comprises a power input terminal the same configuration as an electronic device connecting terminal of an electronic device that receives either the adapter power or the power output through the power output part.

According an aspect of the present invention, the controller comprises a first switching part to control the input power to be applied to the charging part and the power output part, and a second switching part to control the battery power to be applied to the power output part.

According an aspect of the present invention, the first switching part comprises a first transistor interposed between the power input part and the power output part and turned on to apply the input power to the charging part and the power output part, and a first diode connected in parallel to the first transistor and having an anode connected to one end of the first transistor and a cathode connected to the other end of the first transistor; the second switching part comprises a second transistor interposed between the battery and the power output part and turned on to apply the battery power to the power output part, and a second diode connected in parallel to the second transistor and having an anode connected to one end of the second transistor and a cathode connected to the other end of the second transistor.

According to an aspect of the present invention, when the input power is supplied through the power input part, the first switching part is switched on and the second switching part is switched off, so as to apply the input power to the charging part and to the power output part; and when the input power is not supplied through the power input part, the first switching part is switched off and the second switching part is switched on, so as to apply the battery power to the power output part.

According to an aspect of the present invention, the controller further comprises a microcontroller that compares the voltage difference between the input power and the battery power with a predetermined reference value, and turns on one of the first transistor and the second transistor according to a result of the comparison.

According to another aspect of the present invention, the controller further comprises a microcontroller that controls the first switching part to be switched on and the second switching part to be switched off, so as to apply the input power to the charging part and the power output part when the input power is supplied through the power input part; and controls the first switching part to be switched off and the second switching part to be switched on, so as to apply the battery power to the power output part when the input power is not supplied through the power input part.

According to an aspect of the present invention, the power supply device further comprises a voltage regulator to regulate one of the input power and the battery power, which is output through the power output part, so as to have a predetermined output voltage level.

According to an aspect of the present invention, the voltage regulator further comprises a buck/boost circuit placed ahead of the power output part to regulate one of the input power and the battery power applied to the power output part, so as to have the predetermined output voltage level, and to output the regulated power to the power output part.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
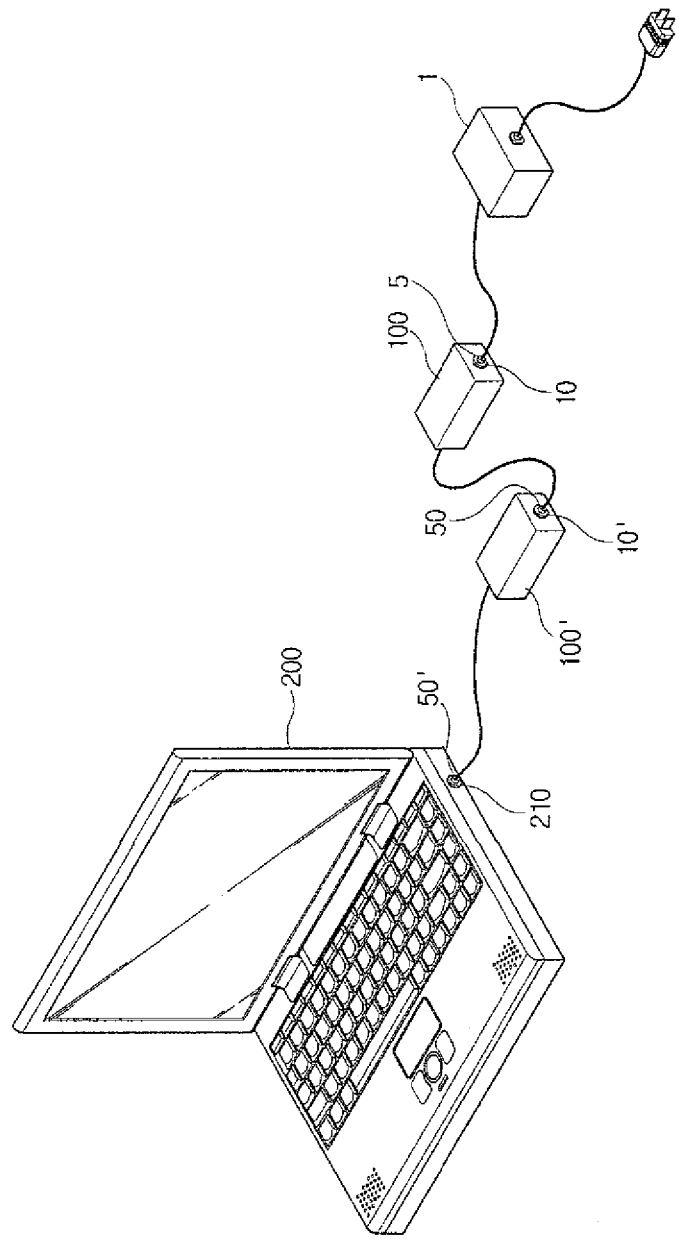
FIG. 1 is a view showing an a power supplying system comprising a power supply device, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, a power supply device 100 according to an embodiment of the present invention comprises a power input part 10 that receives external power, and a power output part 50 that outputs power. The power input part 10 of the power supply device 100 is connected to an adapter connecting terminal 5 of an adapter 1 through which adapter power supplied from the adapter 1 is output to the power output part 50. The internal battery (not shown) of the power supply device 100 is charged by the supplied adapter power. In one embodiment present invention not illustrated in FIG. 1, the adapter power output from the power supply device 100 is applied to an electronic device 200, connected to the power output part 50, and not to the power supply device 100'. In another embodiment of the present invention not illustrated in FIG. 1, the adapter connecting terminal 5 of the adapter 1 is connected to the power input terminal 210 of the electronic device 200, and not to the power supply device 100.

In the embodiment shown in FIG. 1, the power supply device 100 is connected in series to another power supply device 100'. The power supply device 100 is also connected to adapter 1, as described above. The internal battery (not shown) of the power supply device 100 is charged, as described above. The power input part 10' of the second power supply device 100' is connected to the power output part 50 of the first power supply device 100. The internal battery (not shown) of the second power supply device 100' is charged, in the same manner as described above. The power output of the power supply device 100' is supplied to the electronic device 200, via the power output part 50' connected to the power input terminal 210 of the electronic device 200. While not required in all aspects, the electronic device 200 can further have an internal battery (not shown) that is charged by the second power supply device 100', and the electronic device 200 can be utilized while the internal battery of the electronic device 200 is charged.

In this embodiment, although the power supply device 100 and the power supply device 100' have different reference numerals, they have a similar configuration. That is, the power input part 10 and the power output part 50 have the same configuration as the power input part 10' and the power output part 50', respectively. In addition, the power supply device 100' may be connected in series to additional power supply devices of the same configuration. Moreover, while shown in FIG. 1 as separate, the power supply devices could be included in a housing to simplify the connection to the adapter 1 and the portable electronic device 200.

In this manner, the power supply device 100 can output power to an electronic device connected 200 to the power output part 50, while charging the internal battery of both the power supply device 100' and/or the electronic device 200 using power input through the power input part 10.

Figure 2:
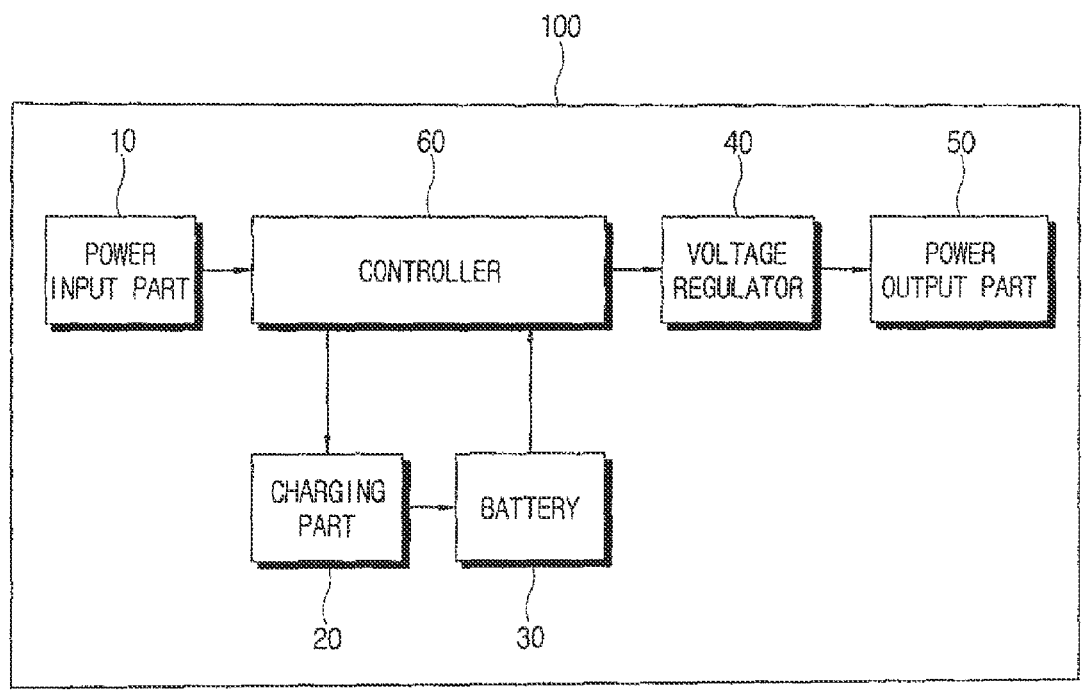
FIG. 2 is a simplified block diagram of the power supply device, according to an embodiment of the present invention.

More specifically, referring to FIG. 1 and FIG. 2, the power supply device 100 comprises the power input part 10, a charging part 20, a battery 30, the power output part 50, and a controller 60. The power input part 10 is connected to the adapter connecting terminal 5 of the adapter 1 to receive the adapter power from the adapter 1. It is preferable, but not necessary, that the power input part 10 comprises the same power input terminal as an electronic device connecting terminal 210, as shown in FIG. 1, of the electronic device 200, so as to allow the adapter 1 to connect to the power supply 100 or to the electronic device 200.

The power output part 50 outputs one of the adapter power input through the power input part 10, and power of the battery 30 to the portable electronic device 200. It is preferable, but not necessary, that the power output terminal 50 comprises the same power output terminal as the adapter connecting terminal 5 of the adapter 1, so as to allow either the adapter 1 or the power supply 100 to connect directly to the electronic device 200.

In this manner, since the power input part 10 and the power output part 50 comprise the same power input terminal as the electronic device connecting terminal 210 of the portable electronic device 200, and the same power output terminal as the adapter connecting terminal 5 of the adapter 1, respectively, the power supply device 100 of the present invention can be readily connected to the adapter 1 and to the portable electronic device 200, and also the power supply device 100 can be connected in series to other similarly configured power supply devices.

The battery 30 supplies power to the portable electronic device 200 and may be embodied by a battery cell having two or more poles, such as a lead-acid, nickel metal hydride, lithium ion, or a lithium polymer battery. The battery 30 is charged by the charging part 20, which will be described later.

The charging part 20 may be embodied by a charging circuit for charging the battery 30 using the adapter power supplied through the adapter 1. For example, the charging part 20 converts the adapter power received from the adapter 1 having a voltage level of 19V into a predetermined voltage level, and charges the battery 30 with the converted voltage.

Figure 6:
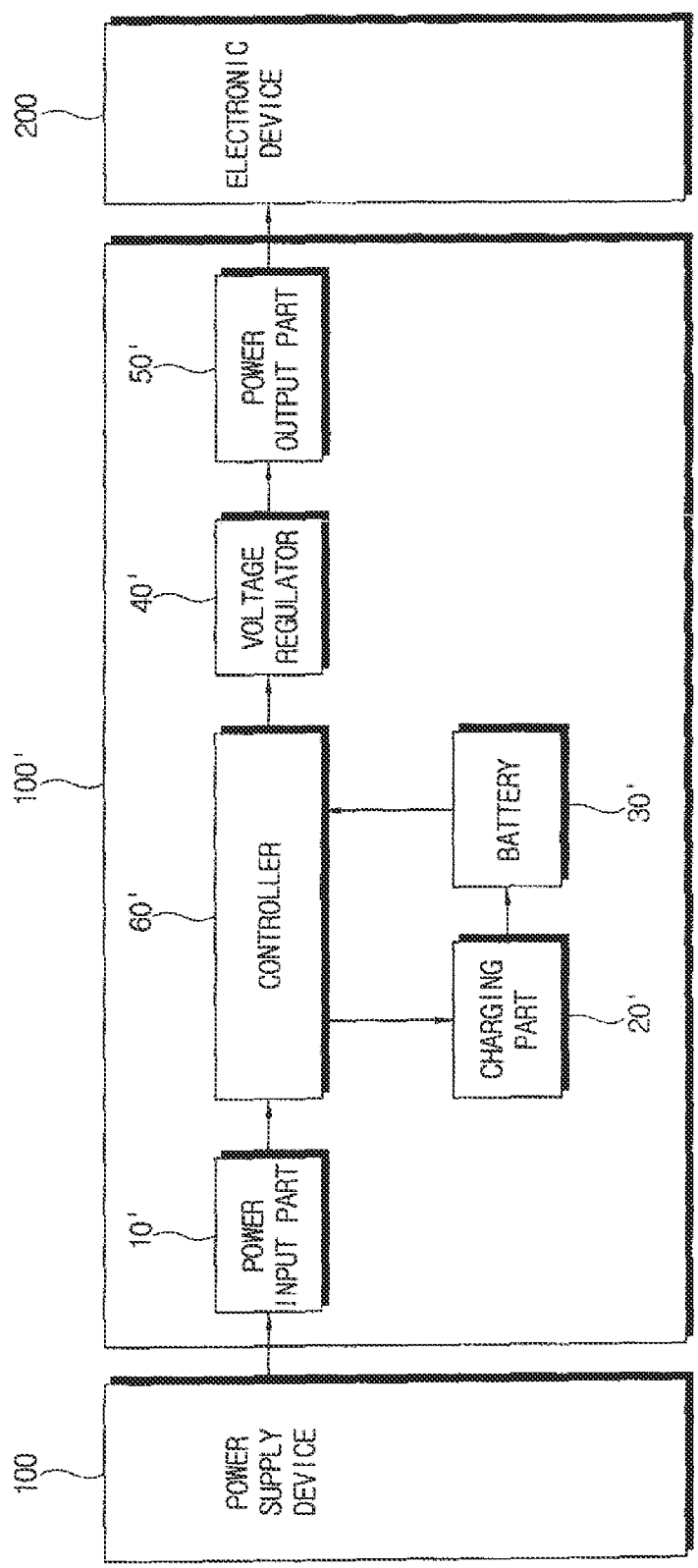
FIG. 6 is a simplified block diagram of the power supply device, according to another embodiment of the present invention.

The controller 60 controls the adapter power to be applied to the charging part 20 and the power output part 50, when the power input part 10 is connected to the adapter 1 and receives the adapter power. The controller 60 controls the battery power of the charged battery 30 to be applied to the power output part 50, when the power input part 10 is not connected to the adapter 1 and does not receive the adapter power. Likewise, as shown in FIG. 1 and FIG. 6, when another power supply device 100 is connected to the power input part 10', the controller 60' controls the input power to apply power to the charging part 20' and the power output part 50'. The controller 60' controls the battery power of the charged battery 30' to apply to the power output part 50', when the power input part 10' is not connected with the power supply device 100 and receives no input power.

Additional aspects of the controller 60 will be described below.

In the embodiment shown in FIG. 2, the power supply device 100 further comprises a voltage regulator 40 that regulates one of the adapter power and the battery power, which are output through the power output part 50, so as to have a predetermined voltage level. However, it is understood that the regulator is not needed in all aspects of the present invention.

As shown in FIG. 2, it is preferable, but not necessary, that the voltage regulator 40 is a buck/boost circuit provided between the power output part 50 and the controller 60 for regulating one of the adapter power received at the input part 10, and the battery power from the battery 30, applied to the power output part 50, so as to have a predetermined level (for example, 19V) of output voltage.

Figure 3:
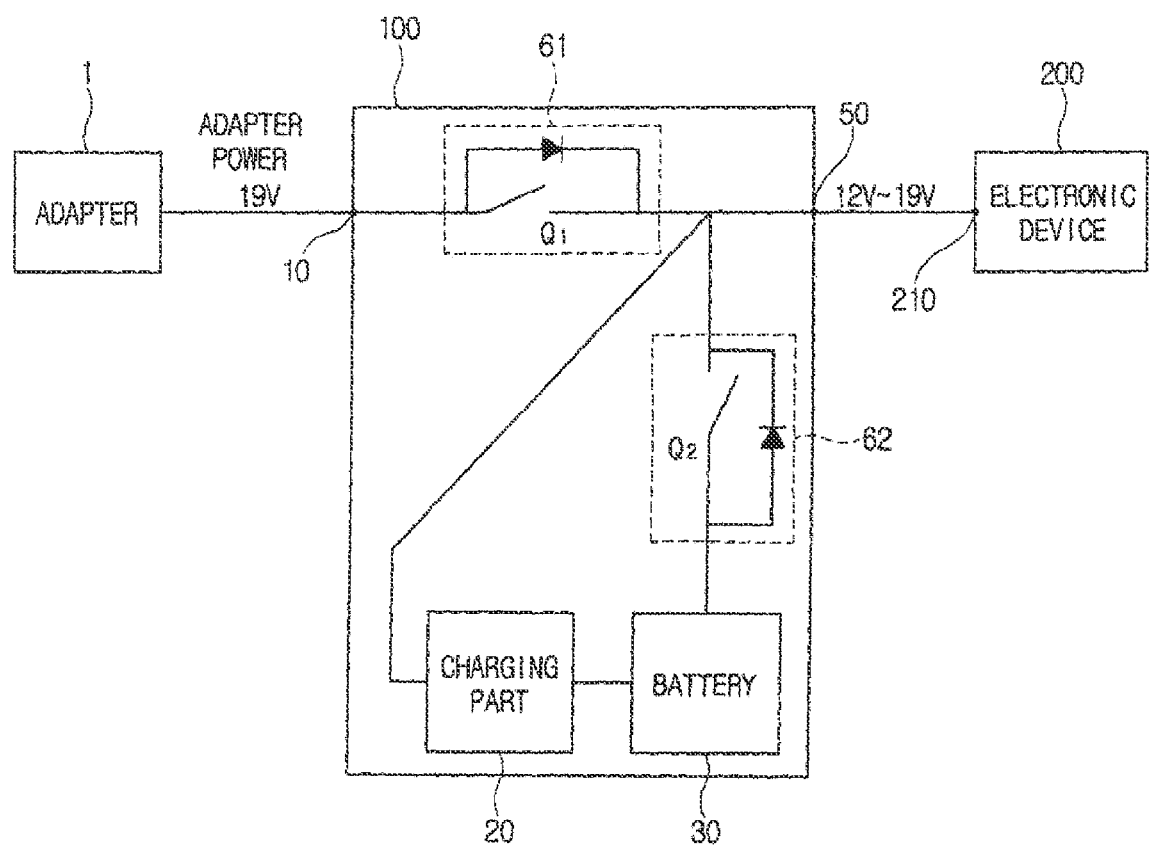
FIG. 3 is a block diagram of a power supplying system comprising a power supply device, according to an embodiment of the present invention.

FIG. 3 is a block diagram of a power supplying system comprising: the power supply device 100 which does not include the voltage regulator 40, according to a first embodiment of the present invention. Later, the controller 60 will be described in more detail with reference to FIG. 3, and repetitive descriptions to the foregoing description referring to FIG. 2 will be omitted.

Referring to FIG. 3, a power supplying system has an adapter 1, a power supply device 100, and a portable electronic device 200 that receives power from the power supply device 100. The power supply device 100 comprises a power input part 10, a charging part 20, a battery 30, a power output part 50, and a controller 60 having parts 61 and 62. The power input part 10, the charging part 20, the battery 30, and the power output part 50 have the same configuration as those shown in FIG. 2.

In this embodiment, the controller 60 comprises a first switching part 61, which controls the input power to be applied to the charging part 20 and the power output part 50. The controller also has a second switching part 62, which controls a battery power to be applied to the power output part 50.

The first switching part 61 and the second switching part 62 perform an ORing switching operation in such a manner that the first switching part 61 is switched on and the second switching part 62 is switched off. Thus, the adapter power is applied to the charging part 20 and the power output part 50, when the adapter power is supplied to the power supply device 100 through the power input part 10. The first switching part 61 is switched off and the second switching part 62 is switched on, so that the battery power is applied to the power output part 50, when the adapter power is not supplied to the power supply device 100.

More specifically, the first switching part 61 comprises a first diode that performs an ORing switching operation, and a first transistor Q1 that is turned on or off according to the voltage across the diode. The second switching part 62 comprises a second diode that performs an ORing switching operation, and a second transistor Q2 that is turned on or off according to the voltage across the diode. In other words, the first and second diodes provided in the first and second switching parts 61 and 62, respectively, are implemented as an OR logic that performs the ORing switching operation, depending on the presence of input power without the requirement for a separate control signal.

In a different embodiment, the controller 60 may comprise a microcontroller (not shown) in addition to or instead of the switching parts 61 and 62, that the microcontroller compares the voltage difference between the adapter power and the battery power with a predetermined reference value, and turns on one of the first and second transistors Q1 and Q2 and turns off the other of the first and second transistors Q1 and Q2 according to a result of the comparison.

In the diode control configuration detailed above, when the adapter power is input to the power supply device 100 through the power input part 10, the first switching part 61 is switched on and the second switching part 62 is switched off, according to the ORing switching operations of the first and second diodes provided in the first and second switching parts 61 and 62, respectively. Thus, the adapter power is applied to the charging part 20 and the power output part 50 through the first diode In the microcontroller configuration detailed above, the first transistor Q1 is turned on and the second transistor Q2 is turned off, according to control of the microcontroller that compares the voltage difference between the adapter power and the battery power with the reference value, so that the adapter power is applied to the charging part 20 and the power output part 50 through the first transistor Q1. An example of the microcontroller control is: if the voltage difference between the adapter power and the battery power is equal to or less than 100 mV, the first transistor Q1 is turned on and the second transistor Q2 is turned off, such as when the adapter 1 is connected to the power supply device 100. Both embodiments allow the power supply device 100 to supply the adapter power to the portable electronic device 200 connected to the power output part 50 while the charging part 20 charges the battery 30 with the input power.

In contrast, when the adapter power is not input to the power supply device 100 through the power input part 10, the first switching part 61 is switched off and the second switching part 62 is switched on, according to the ORing switching operations of the first and second diodes provided in the first and second switching parts 61 and 62, respectively. Thus, the battery power is applied to the power output part 50 through the second diode.

Alternatively, the first transistor Q1 is turned off and the second transistor Q2 is turned on, according to the control of the microcontroller that compares the voltage difference between the adapter power and the battery power with the reference value, so that the battery power is applied to the power output part 50 through the second transistor Q2. For example, if the voltage difference between the adapter power and the battery power is greater than 100 mV, the first transistor Q1 is turned off and the second transistor Q2 is turned on, such as when the adapter 1 is not connected to the power supply device 100. Accordingly, the power supply device 100 can supply the battery power of the charged battery 30 to the portable electronic device 200 connected to the power output part 50 when there is no power input to the power supply device 100.

In this embodiment, it should be understood that the function of the microcontroller that controls the first and second transistors Q1 and Q2 may be realized by a controller (not shown) provided in the charging part 20. It should also be understood that the transistors Q1 and Q2 may constitute field-effect transistors, bipolar junction transistors, relay switches, vacuum tubes, or any other suitable switching device.

In addition, the first and second switching parts 61 and 62 may comprise only an OR logic that performs an ORing switching operation without using a separate control signal, that is, only switching elements such as relay switches or transistors, which are switched by a predetermined control signal, without comprising first and second diodes. In addition, the controller 60 may comprise a microcontroller, digital logic circuits, a programmable logic device, a microcomputer, or similar suitable device that controls the first and second switching parts 61 and 62 according to a control signal output based on the supply of the input power to the power input part 10.

Referring again to FIG. 3, when the microcontroller determines that the adapter 1 is connected to the power input part 10 or the input power is input to the power supply device 100, the microcontroller causes the first switching part 61 to be switched on and the second switching part 62 to be switched off, so that the input power is applied to the charging part 20 and the power output part 50. Conversely, when the microcontroller determines that the input power is not input to the power supply device 100, it causes the first switching part 61 to be switched off and the second switching part 62 to be switched on, so that the battery power is output through the power output part 50.

As described above, the power supply device according to the embodiments of the present invention shown in FIGS. 1 through 3 can output power to a portable electronic device connected to a power output part while charging an internal battery with power input from an external source through a power input part. That is, the power supply device according to embodiments of the present invention can charge the internal battery of the power supply device and/or charge the internal battery of the portable electronic device, and power the operation of the portable electronic device. Accordingly, a portable electronic device to be supplied with power from the power supply device of an embodiment of the present invention can receive the adapter power or the battery power from the power supply device without exchanging or discharging an internal battery of the portable electronic device, thereby prolonging use time of the internal battery of the electronic device.

As an illustration using FIG. 3, assume that the battery 30 of the power supply device 100 can output the battery power of 12V to 16.8V from a battery 30 configuration of four serial sets of two parallel-connected battery cells, each having a charging voltage of 4.2V, a nominal voltage of 3.7V and a cutoff voltage of 3.0V. The adapter 1 can output the adapter power of 60 W and 19V. The portable electronic device 200 will thus receive the adapter power of 19V in the adapter mode and the battery power of 12V to 16.8V in the battery mode.

In other words, since the power (the adapter power or the battery power) output from the power supply device 100 varies between 12V and 19V, there is a possibility that the portable electronic device 200 misjudges whether or not input power is present. Accordingly, the portable electronic device 200 has to employ a circuit configuration to cover a relatively large voltage variation (12V to 16.8V) provided from the power supply device 100, so as to be able to detect and utilize voltages varying from 12V to 19V.

Figure 4:
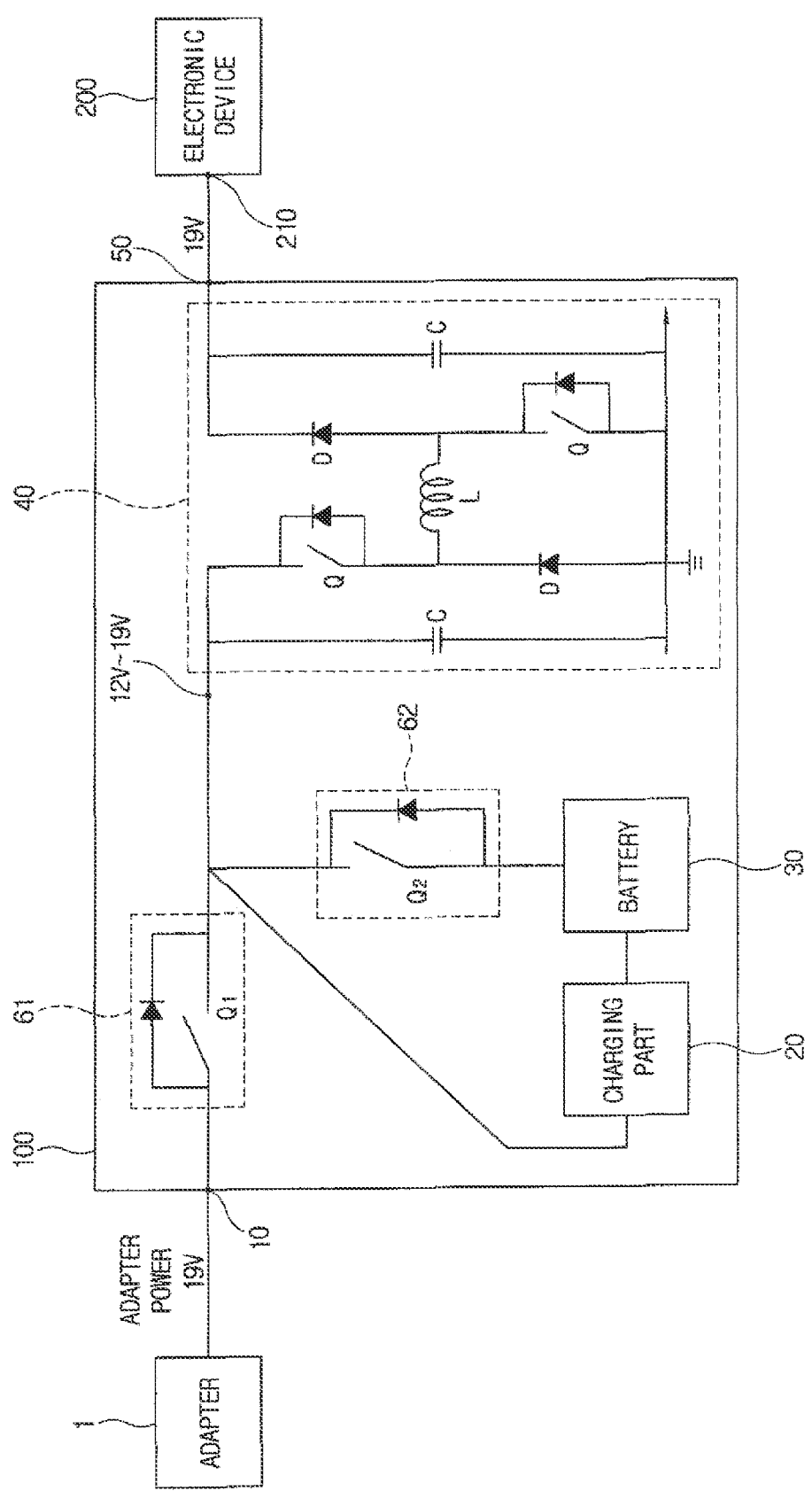
FIG. 4 is a block diagram of a power supply device, according to another embodiment of the present invention.

To provide regulated power to an electronic device, one embodiment of the present invention includes a voltage regulator 40 as shown in FIG. 4. As before, descriptions detailed above t will be omitted.

Referring to FIG. 4, a power supply system according to the alternative embodiment of the present invention comprises an adapter 1, a power supply device 100, and a portable electronic device 200. The power supply device 100 comprises a power input part 10, a charging part 20, a battery 30, a voltage regulator 40, a power output part 50, and a controller having two switching parts 61 and 62. The power input part 10, the charging part 20, the battery 30, and the controller have the same configuration as those shown in FIG. 3 and is detailed above.

The voltage regulator 40 regulates one of the adapter power and the battery power output through the power output part 50, so as to have a predetermined voltage level.

As shown in FIG. 4, it is preferable, but not necessary, that the voltage regulator 40 is a buck/boost circuit disposed between the output part 50 and the switching parts 61 and 62 for regulating one of the adapter power (19V) and the battery power (12V to 16.8V) applied to the power output part 50 to have a predetermined voltage level. The function, components, and the details of the buck/boost circuit employed in the voltage regulator 40 as shown in FIG. 4 are widely known in the field of circuit design, and therefore, description thereof will be omitted. Here, it is preferable but not necessary that the predetermined level of voltage output from the voltage regulator 40 is 19V.

As described above, the power supply device according to the embodiment of the present invention shown in FIG. 4 can output power to a portable electronic device connected to a power output part, while charging an internal battery of the power supply device and/or charging the internal battery of the electronic device with power input from an external source through the power input part. That is, the power supply device can provide power and charge the internal battery at the same time.

Accordingly, a portable electronic device to be supplied with power from the power supply device of the present invention can receive the adapter power and the battery power through the power supply device, without exchanging or discharging an internal battery of the portable electronic device, thereby prolonging use time of the internal battery of the portable electronic device.

In addition, the power supply device according to the second embodiment of the present invention can output power having a specified voltage level to an external electronic device irrespective of whether the power supply device is in supplied with the input power or discharging the battery. In this manner, since the power output from the power supply device according to the second embodiment of the present invention has a constant voltage level, a general portable electronic device can use power supplied thereto without any separate circuit modification and without any erroneous operation, such as an incorrect setting of the power supply or voltage.

The above-described power supplying system comprising the power supply device 100 is operable in the following four modes.

A first mode is a power supply device charging mode where the adaptor 1 is connected to the power supply device 100. In this mode, the power supply device 100 charges the battery 30 with the adapter power supplied through the adapter 1.

A second mode is a power supply device discharging mode where the power supply device 100 is connected to the portable electronic device 200 and the adapter 1 is not connected to the power supply device 100. In this mode, since the adapter 1 is not connected to the power supply device 100. Accordingly, no power is supplied to the power supply device 100, the power supply device 100 outputs the battery power of the charged battery 30 to the portable electronic device 200. In this case, the battery power output from the power supply device 100 is regulated by the voltage regulator 40 to have a specified voltage level (for example, 19V). Thus, an internal battery (not shown) of the portable electronic device 200 is charged and/or the portable electronic device 200 operates from the battery power of the power supply device.

A third mode is a mode where the adapter 1, the power supply device 100, and the portable electronic device 200 are connected in series. In this mode, the power supply device 100 charges the battery 30 of the power supply device 100 with the adapter power supplied from the adapter 1. Adapter power is supplied through the power supply device 100 to the portable electronic device 200. Thus, an internal battery (not shown) of the portable electronic device 200 is charged by the adapter power and the portable electronic device 200 operates with the adapter power.

A fourth mode is a mode where the adapter 1 is connected to the portable electronic device 200. In this mode, the adapter power supplied through the adapter 1 is directly applied to the portable electronic device 200 while charging the internal battery of the portable electronic device 200, and the portable electronic device 200 operates with the adapter power.

As described above, the portable electronic device 200 receives the power (the adapter power or the battery power) having a constant voltage level in any of the above four modes of the power supplying system comprising the power supply device 100 of the present invention.

Figure 5:
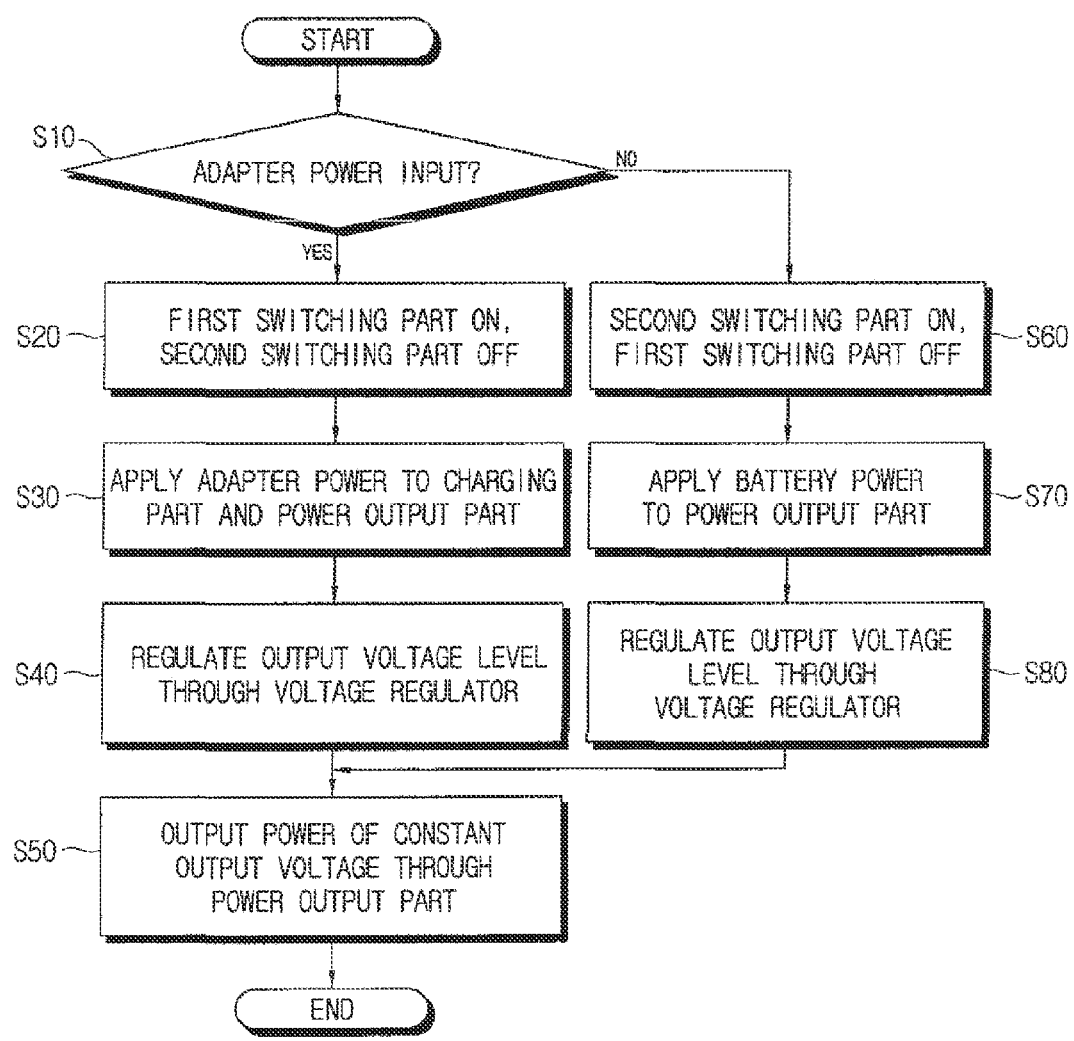
FIG. 5 is a flow chart of a power supply device, according to an embodiment of the present invention.

Hereinafter, a power supplying method for the power supply device 100 according to the embodiment of the present invention shown in FIG. 4 will be described with reference to FIG. 5.

First, the microcontroller determines if the adapter 1 is connected to the power input part 10 and is supplying input power to the power supply device 100, at S10. If it is determined at S10 that the adapter power is input to the power supply device 100, the first switching part 61 is switched on and the second switching part 62 is switched off at S20. Thus, the adapter power is applied to both the charging part 20 and the power output part 50 at S30.

The adapter power applied to the power output part 50 is stepped up or down to have a predetermined output voltage level (for example, 19V) by the voltage regulator 40 at S40. Thus, the adapter power, having the predetermined output voltage level, is output through the power output part 50 at S50.

On the other hand, if it is determined at S10 that power is not input to the power supply device 100, the first switching part 61 is switched off, and the second switching part 62 is switched on at S60, so that the power supply device 100 outputs the power of the battery 30. Thus, the battery power is applied to the power output part 50 at S70.

The battery power applied to the power output part 50 is stepped up or down to a predetermined output voltage level (for example, 19V) by the voltage regulator 40 at S80. Thus, the battery power, having the predetermined output voltage level, is output through the power output part 50 at the S50.

As described above, the power supplying method for the power supply device according to aspects of the present invention provide a method to output power to a portable electronic device connected to a power output part while charging an internal battery of the power supply device with power input from an external source through a power input part. That is, according to the power supplying method of the power supply device according to an aspect of the present invention, the internal battery can be charged while providing power to a portable electronic device.

In addition, the power supplying method for the power supply device according to an aspect of the present invention provides a method of power having a specified voltage level (for example, 19V) that can be output to an external electronic device irrespective of whether the power supply device is supplied with the input power or discharging the battery, thereby allowing the power supply device to be used for a general power supply device and avoid incorrect settings of a power supply device or voltages.

As apparent from the above description, aspects of present invention provide a power supply device, which is capable of applying adapter power applied through an adapter to a portable electronic device while charging an internal battery with the adapter power, and a power supplying method for the power supply device.

In addition, the present invention provides a power supply device, which can be universally used for common portable electronic devices, and a power supplying method for the power supply device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system comprising:
   a portable electronic device including:
      a system unit,
      an internal power supply unit including a first rechargeable battery and supplying an operating power to the system unit, and
      a first power input part to receive electrical power from an external source;
   an AC adapter to convert AC power from an electrical outlet into an adapter power of a first voltage level, the AC adapter including an adapter connecting terminal through which the adapter power is supplied; and
   an external power supply device including a second rechargeable battery of a second voltage level which is lower than the first voltage level, connectable between the AC adapter and the portable electronic device, the external power supply device including:
      a second power input part connectable to receive the adapter power from the AC adapter,
      a charging part to charge the second rechargeable battery using the adapter power from the AC adapter,
      a power output part,
      a controller to control an amount of the adapter power applied to the charging part and the power output part, when the second power input part is connected to receive the adapter power from the AC adapter, and
      a voltage regulator coupled between the controller and the power output part;
      wherein, when no power is received by the second power input part of the external power supply device, the voltage regulator of the external power supply device receives battery power supplied from the second rechargeable battery and increases the second voltage level of the received battery power, which is supplied to the power output part of the external power supply device, to the first voltage level of the adapter power,
   wherein the portable electronic device is connectable to receive power from either one of the AC adapter and the external power supply device.

2. The system according to claim 1, wherein the first voltage level of the adapter power is 19V.

3. The system according to claim 2, wherein the controller comprises:
   a first switch to control the adapter power to be applied to the charging part and the power output part; and
   a second switch to control the battery power to be applied to the power output part.

4. The system according to claim 3, wherein the first switch comprises:
   a first transistor interposed between the second power input part and the power output part and turned on to apply the adapter power to the charging part and the power output part;
   a first diode connected in parallel to the first transistor and having an anode connected to one end of the first transistor and a cathode connected to the other end of the first transistor; and the second switch comprises:
   a second transistor interposed between the second rechargeable battery and the power output part and turned on to apply the battery power to the power output part; and a second diode connected in parallel to the second transistor and having an anode connected to one end of the second transistor and a cathode connected to the other end of the second transistor.

5. The system according to claim 4, wherein:
when the adaptor power is supplied through the second power input part, the first switch is switched on and the second switch is switched off, so as to apply the adaptor power to the charging part and to the power output part; and
when the adaptor power is not supplied through the second power input part, the first switch is switched off and the second switch is switched on, so as to apply the battery power to the power output part.

6. The system according to claim 5, wherein the controller further comprises:
a microcontroller that compares the voltage difference between the adaptor power and the battery power with a predetermined reference value, and turns on one of the first transistor and the second transistor according to a result of the comparison.

7. The system according to claim 6, wherein the controller further comprises:
a microcontroller that controls the first switch to be switched on and the second switch to be switched off, so as to apply the adaptor power to the charging part and the power output part when the adaptor power is supplied through the second power input part, and controls the first switch to be switched off and the second switch to be switched on, so as to apply the battery power to the power output part when the adaptor power is not supplied through the second power input part.

8. The system according to claim 1, wherein the voltage regulator further comprises:
a buck/boost circuit placed ahead of the power output part to regulate the battery power applied to the power output part, so as to have a predetermined voltage level of the adapter power, and to output the regulated power to the power output part.

9. The system according to claim 8, wherein, the power output part comprises a power output terminal having the same configuration as the adapter connecting terminal of the adapter that connects to the second power input part, and
wherein the second power input part comprises a power input terminal having the same power configuration as a connecting terminal of the first power input part that connects to the power output part.

10. The system according to claim 9, wherein, when the adaptor power is supplied to the second power input part of the external power supply device, the system operates in an external power supply device charging mode where the charging part charges the battery with the adaptor power input to the external power supply device.

11. The system according to claim 10, wherein, when the adaptor power is not supplied to the second power input part of the external power supply device, the system operates in an external power supply device discharging mode where the battery power of the second rechargeable battery is applied to the power output part through the second switch and the voltage regulator.

12. The system according to claim 11, wherein, when the adapter connecting terminal of the adapter is connected to the first power input part of the portable electronic device, so as to apply the adapter power to the portable electronic device, the portable electronic device operates with the supplied adapter power and a first rechargeable battery of the portable electronic device is charged with the adapter power.

13. The system according to claim 12, wherein, when the adaptor power is supplied to the second power input part of the external power supply device and the portable electronic device is connected to the power output part of the external power supply device,
the charging part charges the second rechargeable battery with the adaptor power input to the external power supply device, the increased power which is increased by the voltage regulator is applied to the power output part, the portable electronic device operates with the increased power supplied from the external power supply device, and a first rechargeable battery of the portable electronic device is charged with the increased power.

14. The system according to claim 13, wherein the system further comprises:
another external power supply device connected to the output part of the external power supply device and to the first power input part of the portable electronic device, the another external power supply device comprising:
another rechargeable battery;
another charging part charging the rechargeable battery;
another power input part receiving adapter power connected to the adapter;
another power output part outputting the adapter power to the external power supply device; and
a controller controlling the adapter power to be applied to the charging part and to the power output part when the power input part is supplied with the adapter power, and controlling the battery power to be applied to the power output part when the power input part is not supplied with adapter power.

15. A power supply device connectable in series between a portable electronic device and an AC adapter, the power supply device comprising:
a rechargeable battery of a first voltage level;
a power input part connectable to receive an adapter power from the AC adapter;
a charging part to charge the rechargeable battery using the adapter power from the AC adapter of a second voltage level which is higher than the first voltage level;
a power output part;
a controller to control an amount of the adapter power applied to the charging part and the power output part, when the power input part is connected to receive the adapter power from the AC adapter; and
a voltage regulator coupled between the controller and the power output part,
wherein, when no power is received by the power input part, the voltage regulator receives battery power supplied from the rechargeable battery and regulates increases the first voltage level of the received battery power, which is supplied to the power output part, to the second voltage level of the adapter power.

16. The power supply device of claim 15, wherein the second voltage level of the adapter power is 19V.

17. The power supply device of claim 15, wherein the power input part is connectable to another power supply device, so as to receive a battery power from the another power supply device, and
the controller controls an amount of the received battery power applied to the charging part and the power output part.

18. The power supply device of claim 15, wherein the power output part comprises:

a power output terminal having the same configuration as the adapter connecting terminal of the adapter that connects to the power input part; and the power input part comprises:
a power input terminal having the same configuration as a portable electronic device connecting terminal of a portable electronic device that receives either the adapter power or the power output from the power output part.

19. The power supply device of claim 18, wherein the controller comprises:
a first switch to control the adapter power to be applied to the charging part and the power output part; and
a second switch to control the battery power to be applied to the power output part.

20. The power supply device of claim 19, wherein the first switch comprises:
a first transistor interposed between the power input part and the power output part and turned on to apply the adapter power to the charging part and the power output part;
a first diode connected in parallel to the first transistor and having an anode connected to one end of the first transistor and a cathode connected to the other end of the first transistor; and
the second switch comprises:
a second transistor interposed between the battery and the power output part and turned on to apply the battery power to the power output part; and
a second diode connected in parallel to the second transistor and having an anode connected to one end of the second transistor and a cathode connected to the other end of the second transistor.

21. The power supply device of claim 20, wherein, when the adaptor power is supplied through the power input part, the first switch is switched on and the second switch is switched off, so as to apply the adaptor power to the charging part and to the power output part; and
when the adaptor power is not supplied through the power input part, the first switch is switched off and the second switch is switched on, so as to apply the battery power to the power output part.

22. The power supply device of claim 21, wherein the controller further comprises:
a microcontroller that compares the voltage difference between the adaptor power and the battery power with a predetermined reference value, and turns on one of the first transistor and the second transistor according to a result of the comparison.

23. The power supply device of claim 22, wherein the controller further comprises:
a microcontroller that controls the first switch to be switched on and the second switch to be switched off, so as to apply the adaptor power to the charging part and the power output part when the adaptor power is supplied through the second power input part, and controls the first switch to be switched off and the second switch to be switched on, so as to apply the battery power to the power output part when the adaptor power is not supplied through the second power input part.

24. The power supply device of claim 23, wherein the voltage regulator further comprises:
a buck/boost circuit placed ahead of the power output part to regulate the battery power applied to the power output part, so as to have a predetermined voltage level of the adapter power, and to output the regulated power to the power output part.

* * * * *